United States Patent
Lockwood

(10) Patent No.: US 7,349,881 B1
(45) Date of Patent: Mar. 25, 2008

(54) COMPUTER BORROW AND LOAN SECURITIES AUCTION SYSTEM

(76) Inventor: David Lockwood, 2798 Broadway, Pacific Heights, San Francisco, CA (US) 94115

(*) Notice: Subject to any disclaimer, the term of this patent is extended or adjusted under 35 U.S.C. 154(b) by 1492 days.

(21) Appl. No.: 09/890,815

(22) PCT Filed: Nov. 2, 2000

(86) PCT No.: PCT/US00/30120

§ 371 (c)(1),
(2), (4) Date: Feb. 6, 2002

(87) PCT Pub. No.: WO01/33463

PCT Pub. Date: May 10, 2001

Related U.S. Application Data

(60) Provisional application No. 60/163,303, filed on Nov. 3, 1999.

(51) Int. Cl.
*G06Q 00/40* (2006.01)
(52) U.S. Cl. .................... 705/37; 705/35; 705/36; 705/38; 705/53; 235/380
(58) Field of Classification Search ........... 705/35–38, 705/26, 53; 395/235; 235/380
See application file for complete search history.

(56) References Cited

U.S. PATENT DOCUMENTS

| | | | |
|---|---|---|---|
| 5,077,665 A | | 12/1991 | Silverman et al. |
| 5,664,115 A | | 9/1997 | Fraser |
| 5,715,402 A | | 2/1998 | Popolo |
| 5,845,266 A | | 12/1998 | Lupien et al. |
| 5,966,699 A | | 10/1999 | Zandi |
| 6,058,379 A | * | 5/2000 | Odom et al. .................. 705/38 |
| 6,078,906 A | * | 6/2000 | Huberman .................. 705/37 |
| 6,408,282 B1 | * | 6/2002 | Buist .......................... 705/37 |
| 2002/0032642 A1 | * | 3/2002 | Chichilnisky ............... 705/37 |

* cited by examiner

*Primary Examiner*—Harish T. Dass
(74) *Attorney, Agent, or Firm*—McDermott Will & Emery LLP

(57) ABSTRACT

An auction system is disclosed which allows users to participate using their own, or the exchanges, or a brokers, computers, suitably connected to the auction system. This connection may use the internet or a private leased line or an alternative network. The invention involves a method and system for providing auction mechanisms, including a wide variety of types of auctions as described below, and a central counterparty for assuming credit risk between borrowers and lenders, if the borrowers and lenders chose not to transact with each other. This method and auction system provides a means for borrowers and lenders of securities to meet more efficiently, to trade at a better price, to trade in larger size, to trade more rapidly, and, in some cases eliminate the role of the broker as an intermediary between borrower and lender. This mechanism facilitates not only a borrowing and subsequent short sale of securities but also the financing of securities.

7 Claims, 2 Drawing Sheets

COMPUTER BORROW AND LOAN SECURITIES AUCTION SYSTEM

RELATED APPLICATION

The present application claims the benefit of U.S. Provisional Patent Appl. Ser. No. 60/163,303, entitled "Computer Borrow and Loan Securities Auction System" filed Nov. 3, 1999, the contents of which are incorporated by reference herein in their entirety.

FIELD OF THE INVENTION

The present invention relates to the exchange of securities and cash among borrowers and lenders. More particularly, the present invention relates to conducting an electronic auction over a computer network, such as Internet.

BACKGROUND OF THE INVENTION

Traditionally, a borrower of securities, such as a hedge fund, established a prime brokerage relationship with a broker. That borrower of securities entered into various agreements with the broker relating to collateral, margining and payment in return for a variety of services. In an alternative arrangement, a borrower of securities would arrange an account with another broker or in lender of securities.

Once an agreement was established, the borrower of securities phones the broker, or lenders securities, and requests to take securities and give cash. The broker would then call lenders of securities, which may include other brokers and custodial banks, and ask if they are willing to give securities and receive cash. Typically, the broker acts as intermediary, assuming the risk that either the borrower or lender of securities may default on their obligations. If the broker can find securities that the borrower wishes to receive at an acceptable price, then the broker may complete the transaction and moved the securities between the counterparties at agreed-upon date. In return for this service and assuming credit risk, the broker receives compensation from the borrower and lending the security in the form of a spread between the rate of interest paid on the cash from the taker of cash to the giver of cash.

At a later date, the lenders securities may ask for the securities to be returned. In this case, the broker will call the borrower of securities and asked the securities returned the broker for returning to the lender. Also, at a later date, the borrower of securities may asked for the securities to begin back. In this case, the broker will call the lenders securities and formed them that the securities will be returned. Generally, the initial transaction is done for an open settlement date—that is no fixed agreed-upon settlement date. However, in some cases the borrower and lenders may agree on a fix settlement date.

The use of a broker as an intermediary, however, incurs a number of disadvantages from the perspectives of the lenders and borrowers. For example, the broker earns money by maintaining a spread between the lender and borrower, which, if too high, can make certain otherwise desirable transactions too costly to execute. Consequently, it is difficult for lenders and borrowers to know the going fee for the loan of securities. In addition, the broker's access to different lenders and borrowers may be very limited or very slow, thereby making it difficult to find lenders and borrowers of huge number of securities or within a desired amount of time.

SUMMARY OF THE INVENTION

In accordance with one aspect of the present inventions, the role of the broker, in some cases, is replaced by a borrow and loan securities auction system that matches the prices and quantities for transactions among borrowers and lenders, using any one of various auctions. Preferably, the spread between the borrower and lender is reduced to zero, so that the borrower and lender agree to same fee in the loan of a specific quantity of securities. (The owner of the auction system makes his money not by the spread, but, for example, by charging an appropriate transaction fee.) In one embodiment, consummated transactions are recorded and published, thereby fostering greater transparency in the securities loan market.

In another aspect of the present invention, the auction system can also provide a central counterparty to replace the role of the broker as an assumptor of risk.

Some benefits and advantages include lower cost for borrower and lender by potentially eliminating one of the intermediaries; greater quantity of securities transacted for the borrower lender; greater transparency for the borrower and lender, to publishing of the prices; greater anonymity for the borrower lender, to eliminating the broker and supplying a central counterparty; greater knowledge of the market and therefore ability to buy and sell through a transparent mechanism to determine bids and offers for borrowers and lenders; faster response for borrowers and lenders in completing transactions, then phone calls between brokers; a price history of bids offers in transactions to a borrowers and lenders, not currently available since there is no centralize marketplace; and potentially less credit risk as be central counterparty of the exchange may be a superior credit to the individual brokers currently in the market.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

Figure 1:
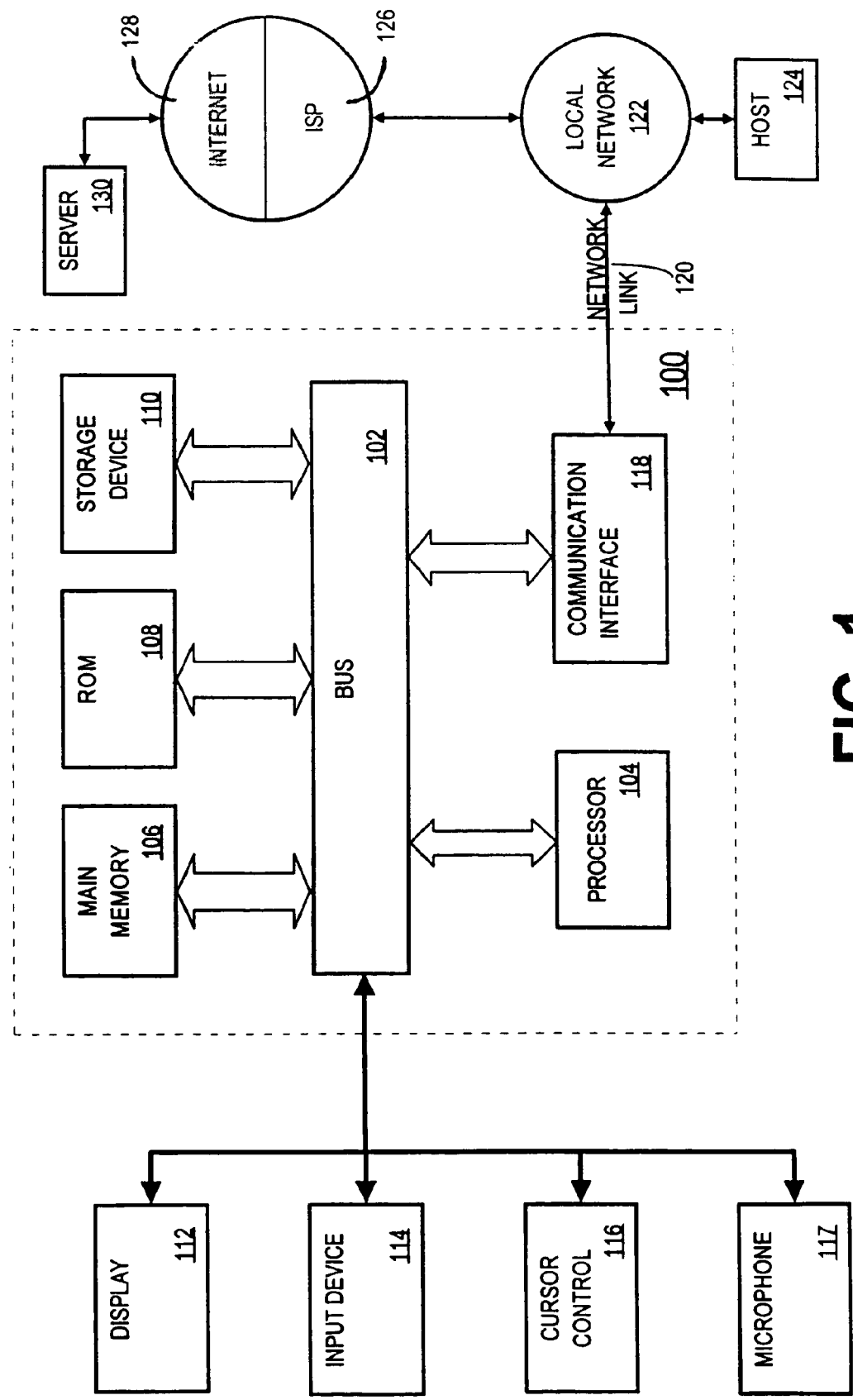
FIG. 1 depicts a computer system that can be used to implement the present invention.

Techniques for computer borrow and loan securities auction system and method are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for a borrow and loan securities auction. According to one embodiment of the invention, a borrow and loan securities auction is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for a borrow and loan securities auction as described herein. The received code may be executed by processor 104 as it is received, and/or stored in storage device 110, or other non-volatile storage for later execution. In this manner, computer system 100 may obtain application code in the form of a carrier wave.

Borrow and Loan Auction System

Figure 2:
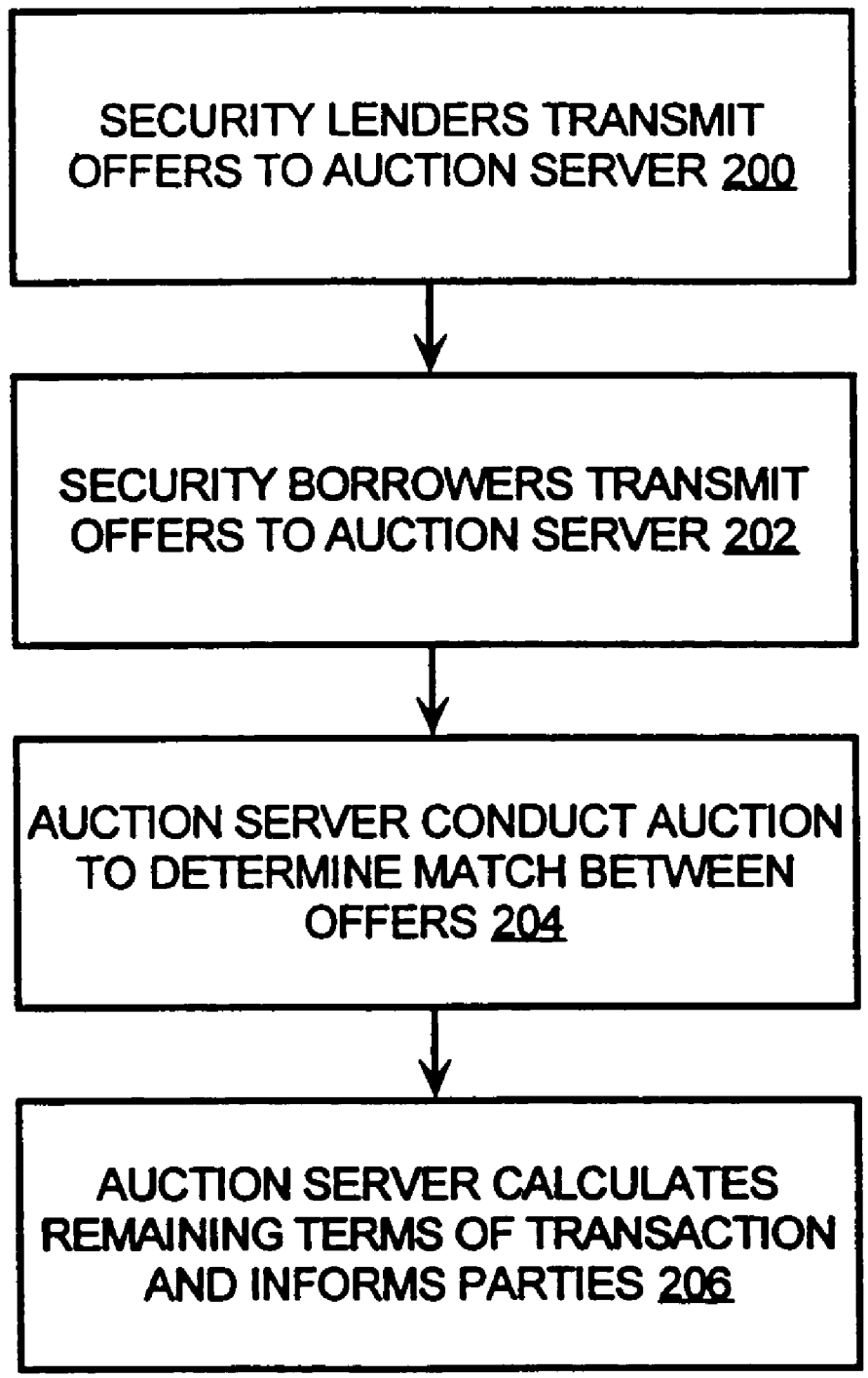
FIG. 2 shows a flowchart illustrating one embodiment of the present invention.

FIG. 2 is a flowchart illustrating the operation of one embodiment of the present invention, in which the major participants are the borrower, the lender, and the exchange. The borrowers and lenders may be in either case brokers, hedge funds, custodial banks, corporations, mutual funds, pension plans, other financial market participants. The securities may be equities, bonds, currencies, derivatives, and other financial instruments.

In another embodiment, a central counterparty is also involved. The borrowers and lenders may be members of the central counterparty, or alternatively, accept the credit risk of the opposing side of any transactions.

At step 200, the lenders of securities will transmit electronic messages indicating offers to an auction server, in which each offer indicates a quantity of securities and a fee. For example, one lender could transmit an offer for 100 shares of Acme, Inc. at 3%. Preferably, these are the only terms that the lender needs to specify, because the auction server will automatically determine the proper reference price, interest rate, the return date, and other parameters by published criteria, for example, the last sale price for the reference price of the security, and the federal funds rate for the interest rate.

However, the present invention is not limited to this preferred embodiment, and in order embodiments, the lender is allowed to specify additional terms in the offer, such as a reference price, and a trade date plus a settlement date. In addition, the lenders of securities may specify a date in which the securities must be returned, which can be automatically set to the following day after the original settlement date.

The auction server can allow lenders of securities to decide which of multiple auctions in which to put their offers. Depending on the auction, additional information may be required. For example, if the auction is a periodic call, or as a fixed time, the lenders securities will have to input a time field as well, such as open or close or a given time interval. The auction server will then aggregate, on a continuous basis, if appropriate for that given type of auction, or a periodic or other basis if appropriate for another type of auction, the information above for all the lenders of securities and display that on the screen.

At step 202, the borrowers of securities transmits offers to the auction server, indicating at least a desired quantity of security and a desired fee. In addition, for alternate embodiments, the borrowers can also specify a reference price and a trade date plus a settlement date.

At step 204, the auction server conducts the auction to determine a match between a lender's offers and a borrower's offers, according to the auction rules in place for that particular option. Various auctions are contemplated, but the present invention is not limited to any particular auction, for example, English auctions, Dutch auctions, first price sealed bid, uniform second price, double auctions, simultaneous bidding, hazard systems, handshake whisper time interval auctions, silent auctions, callable bid rotation auctions, the Swiss auction, etc.

At step 206, after the lender and borrower are identified, then the remaining terms of the transaction, if any, are calculated, and the borrower and the lender are sent notification of the transaction and their terms. In particular the auction server can be configured to calculate the terms from set criteria and published information.

For example, if the lender and borrower agreed to a transaction involving 100 shares of Acme at 3%, then the auction server can determine the reference price as the last sale price of Acme (or the closing price or price at a specified time), and the interest rate to be charged as the fed funds rate. In this example, assume that the reference price of Acme is $10 per share, and the fed funds rate is 5%. The settlement date and the return date can be agreed upon, or automatically set to the current and next days, respectively. Thus, the borrower would be informed that he can take the 100 shares of Acme and give $1000 cash to the lender on the settlement date, and the lender of the securities would get the $1000 cash and give the 100 shares. On the return date (assuming the next calendar day), the borrower would give back the 100 shares but receive $1000*(interest rate−exchange fee) or, in this example, $1000*(5%−2%)/365=$1000.06 and the lender's position is symmetrical.

Each transaction can be recorded in a database coupled to a web server so that participants can access the terms of the trades via web browsers, thereby making the securities loan market more transparent.

In an embodiment wherein the lender and borrower are members of a central counterparty, the auction server notifies the central counterparty that the borrowers and lenders of securities have an agreed-upon transaction. The central counterparty then instructs that on the trade date the borrower of securities to receive securities and give cash and the lender of securities give securities and takes cash, in the amounts agreed to by both parties. The amount of cash that the central counterparty both takes and receives for the borrower lender of securities may differ; for example, the central counterparty may require the borrower to over-collateralize the loan.

On the date agreed-upon to the securities to be returned, the central counterparty, if involved, notifies the borrower and lenders securities that the transaction be reversed, returning securities to the lender and lender returning the cash, with the borrower providing the securities and cash to complete the transaction.

Borrowers may decide they wish to continue to hold the securities and not returned him on the settlement date. In this case the borrower must go into the market and before a specified time, reach agreement either with the original borrower or another borrower, to retain possession of the securities. In this instance, if a central counterparty is involved, the borrower will not be required to return the securities, but may simply net against the central counterparty. If the central counterparty is not involved, then the borrower must return the securities to the original lender, and then the same time can agree to borrow additional securities from that original lender or another new lender.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for facilitating the mutual exchange of securities and cash, comprising:

receiving a plurality of first indications of offers to lend a security from respective lenders, each of the offers to lend a security indicating a corresponding quantity of the security and a corresponding fee;

receiving a plurality of second indications of offers to borrow the security from respective borrowers, each of the offers to borrow the security indicating a corresponding quantity of the security and a corresponding fee;

matching one of the offers from one of the lenders with one of the offers from one of the borrowers based on the corresponding quantity and the fee; and sending a notification of a transaction between the one lenders and the one borrower based on the matched offer.

2. The method of claim 1, further comprising recording the transaction in a database electronically accessible to a plurality of borrowers and lenders over at least one computer network and least one computer.

3. A computer system comprising a memory and one or more processors, configured to perform the steps of:

receiving a plurality of first indications of offers to lend a security from respective lenders, each of the offers to lend a security indicating a corresponding quantity of the security and a corresponding fee;

receiving a plurality of second indications of offers to borrow the security from respective borrowers, each of the offers to borrow the security indicating a corresponding quantity of the security and a corresponding fee;

matching one of the offers from one of the lenders with one of the offers from one of the borrowers based on the corresponding quantity and the fee; and sending a notification of a transaction between the one lenders and the one borrower based on the matched offer.

4. The computer system of claim 3, wherein said computer system is strictly connected to separate listing financial incentives for real-time confirmation of acceptable financial transactions of the borrowing and lending of securities.

5. The computer system of claim 3, further comprising:

at least one Web computer server for serving as host for computer browsers and providing said browsers with the capability to participate in various auctions of a single product at a specified time the specified number of the product available for sale, and a Web server cooperating the set the database computer separate from some of servers, said computer based computer being in communication with at least one said Web computer server to allow retrieval product information which includes:

a) securities description, b) a quantity of the security to be auctioned c) a duration of the auction, and d) a minimum amount and rate.

6. The computer system of claim 3, wherein the computer system is further configured for implementing one or more auction mechanisms, including an English auction, a Dutch auction, a first price sealed bid uniform second price double auction, a simultaneous bidding hazard system, a handshake whisper time interval auction, a silent auction, a callable bid rotation auction, and a Swiss auction.

7. A method for facilitating the mutual exchange of securities, comprising:

receiving a plurality of first indications of offers to lend a security from respective lenders, each of the offers to lend a security indicating a corresponding quantity of the security and a corresponding fee for lending the security;

receiving a plurality of second indications of offers to borrow the security from respective borrowers, each of the offers to borrow the security indicating a corresponding quantity of the security and a corresponding fee for borrowing the security;

matching one of the offers from one of the lenders with one of the offers from one of the borrowers based on the corresponding quantity and the fee, wherein the fee for lending and the fee for borrowing are equivalent; and sending a notification of a transaction between the one lenders and the one borrower based on the matched offer.

* * * * *